(12) United States Patent
Dusert (10) Patent No.: US 9,815,365 B2
(45) Date of Patent: Nov. 14, 2017

(54) FILLER NECK ASSEMBLY AND A LIQUID TANK EQUIPPED WITH SUCH A FILLER NECK ASSEMBLY

(71) Applicant: VOLVO TRUCK CORPORATION, Göteborg (SE)

(72) Inventor: Christophe Dusert, Ambérieu en Bugey (FR)

(73) Assignee: Volvo Truck Corporation, Göteborg (SE)

( * ) Notice: Subject to any disclaimer, the term of this patent is extended or adjusted under 35 U.S.C. 154(b) by 23 days.

(21) Appl. No.: 15/037,075

(22) PCT Filed: Nov. 29, 2013

(86) PCT No.: PCT/IB2013/003091
§ 371 (c)(1),
(2) Date: May 17, 2016

(87) PCT Pub. No.: WO2015/079281
PCT Pub. Date: Jun. 4, 2015

(65) Prior Publication Data
US 2016/0288641 A1    Oct. 6, 2016

(51) Int. Cl.
*B65B 3/00* (2006.01)
*B60K 15/04* (2006.01)
*B60K 15/03* (2006.01)

(52) U.S. Cl.
CPC .... *B60K 15/04* (2013.01); *B60K 2015/03348* (2013.01); *B60K 2015/0483* (2013.01)

(58) Field of Classification Search
CPC ............................ B60K 15/04–15/0409; B60K 2015/0412–2015/0592; B65D 88/54–88/72

(Continued)

(56) References Cited

U.S. PATENT DOCUMENTS 5,952,559 A * 9/1999 Harris ................ G01M 3/3209
                                                 123/518
6,179,148 B1 * 1/2001 Harris ................ B60K 15/0406
                                                 220/288

(Continued)

FOREIGN PATENT DOCUMENTS

AT          7 933 U1     11/2005
WO      2009013558 A1     1/2009

OTHER PUBLICATIONS

International Search Report (dated Jun. 3, 2014) for corresponding International App. PCT/IB2013/003091.

*Primary Examiner* — Kareen Thomas
(74) *Attorney, Agent, or Firm* — WRB-IP LLP (57) ABSTRACT

A filler neck assembly includes a supporting part designed to be fixed at the inlet of a liquid tank positioned on a motor vehicle and said supporting part having a central through hole mainly formed about a central axis. The filler neck assembly also includes a tubular part that is positioned in said central through hole and said tubular part having a longitudinal axis. The filler neck assembly further includes a first abutment area and a second abutment area attached to one part which is selected between the supporting part and the tubular part, and a contacting area attached to the other part which is selected between the tubular part and the supporting part such that said contacting area can cooperate with one or other of the first and second abutment areas. The first and second abutment areas and the contacting area are arranged so that the cooperation of the contacting area with the first abutment area defines a first angular position of the tubular part with respect to said supporting part and the cooperation of the contacting area with the second abutment area defines a second angular position of the tubular part with respect to said supporting part.

23 Claims, 6 Drawing Sheets

(58) Field of Classification Search
USPC .......... 220/86.1–86.4, 562–564, 565–567.3, 220/581–592, 4.12–4.17, 484, 905, 220/DIG. 33; 141/311 R, 331–345; 222/478
See application file for complete search history.

(56) References Cited

U.S. PATENT DOCUMENTS

| | | | | |
|---|---|---|---|---|
| 6,508,374 | B1 * | 1/2003 | Griffin | B60K 15/0406 220/288 |
| 6,796,451 | B2 * | 9/2004 | Harris | F01P 11/0238 220/203.22 |
| 6,997,339 | B2 * | 2/2006 | Ueki | B60K 15/0406 220/293 |
| 8,714,213 | B2 * | 5/2014 | Girgenrath | B60K 15/04 141/350 |
| 2002/0074335 | A1 * | 6/2002 | Ono | B60K 15/0406 220/304 |
| 2002/0190065 | A1 | 12/2002 | Yoshida et al. | |
| 2006/0086404 | A1 * | 4/2006 | Wu | B62J 37/00 141/59 |

* cited by examiner

FILLER NECK ASSEMBLY AND A LIQUID TANK EQUIPPED WITH SUCH A FILLER NECK ASSEMBLY

BACKGROUND AND SUMMARY

The present invention relates to a filler neck assembly and a liquid tank equipped with such a filler neck assembly.

Road vehicles are equipped with a fuel tank. On industrial vehicles such as trucks, the fuel tank is often located on the side of the chassis frame. Mountings brackets are attached to the chassis frame and the substantially parallelepiped fuel tank rests on the said brackets while straps surround the fuel tank and secure the fuel tank onto the chassis frame. The fuel tank is provided with an inlet port that is closed by a fuel tank cap. The fuel inlet port is traditionally located on the top face of the fuel tank and generally adjacent to the external face of the fuel tank.

In addition to a fuel tank, road vehicles and especially freights trucks can be further equipped with an additional tank for an additive liquid such as urea. To comply with emissions standards, diesel powered vehicles can be fitted with an SCR (Selective Catalytic Reduction) catalytic converter. Urea stored in an additional tank, commonly referred to as urea tank, is spayed into the exhaust gas prior to undergoing depollution treatment in the SCR catalytic converter.

On most industrial vehicles, the urea tank is located next to the fuel tank using mounting brackets similar to those supporting the fuel tank, secured onto the vehicle chassis frame.

Fuel tank and urea tank are equipped at their inlet with a filler neck assembly having an inner tubular part in which can be inserted a liquid dispensing nozzle in order to fill the tank. To guide the dispensing nozzle in the filler neck assembly and to avoid introduction of foreign matter in the fuel or urea tank the inner cross-section of the inner tubular part is generally adjusted, with a small gap, to the external diameter of the dispensing nozzle.

Besides, filler neck assemblies for liquid tanks of motor vehicles and especially filler neck assemblies for urea tanks are usually provided with failsafe means in order to prevent refilling of the liquid tank with an inappropriate liquid, for instance one to prevent refilling of the urea tank with fuel.

One kind of solution for failsafe means consists in or comprises using an inner tubular part of the filler neck assembly which has a cross-section with a specific shape and/or size and a liquid dispensing nozzle which has a complementary shape. In that case, the cross-section of the inner tubular part and the complementary shape of the liquid dispensing nozzle are preferably closely adjusted to prevent the use of an inappropriate dispensing nozzle.

The adjustment between the inner cross-section of the inner tubular part and the dispensing nozzle causes the user to be obliged to seek for an alignment of the liquid dispensing nozzle with the longitudinal axis of the inner tubular part of the filler neck assembly in order to succeed in introducing the dispensing nozzle into the liquid tank inlet. Depending, for instance, on the type of vehicle, on the location of the liquid tank on the vehicle, on the location of the inlet on the liquid tank, on proximity of other vehicle equipment to the liquid tank, the accessibility to the tank inlet can be more or less difficult and consequently the alignment of the dispensing nozzle with the longitudinal axis of the inner tubular part can be in some circumstances hard to find.

Document WO2009013558 discloses a filler neck assembly that comprises a ball joint articulation between the inner tubular part and a supporting part of the filler neck assembly. Thanks to this ball joint articulation the inner tubular part can be inclined with respect to the supporting part. The inner tubular part can be therefore oriented in a convenient direction so that it becomes easier for the user to align the dispensing nozzle with the longitudinal axis of the inner tubular part and so easier to introduce the liquid dispensing nozzle in the inner tubular part.

In WO2009013558, the orientation of the inner tubular part with respect to the supporting part and such as chosen by the user can be lost between two operations of liquid tank filling. The loss of the orientation can be for, instance, due to some vibrations of the vehicle caused, for instance, by the combustion engine especially when it is operating at low engine speed.

In a more troublesome situation, the inner tubular part can be reoriented in an opposite direction which makes the introduction of the dispensing nozzle in the inner tubular part more difficult or impossible for the user. In such a case the user has to try first to reorient the inner tubular part in a convenient direction.

It therefore appears that, from several standpoints, there is room for improvement in filler neck assemblies for liquid tank of motor vehicle and in liquid tanks equipped with such filler neck assemblies.

It is desirable to provide a filler neck assembly that allows a user to more easily introduce a dispensing nozzle in a filler neck assembly of a liquid tank.

According to an aspect of the present invention, a filler neck assembly which comprises at least:
- a supporting part designed to be fixed at the inlet of a liquid tank positioned on a motor vehicle and having a central through hole mainly formed about a central axis XA,
- a tubular part that is positioned in said central through hole, having a longitudinal axis XB,
- at least a first abutment area and a second abutment area attached to one part which is selected between the supporting part and the tubular part,
- at least one contacting area attached to the other part which is selected between the tubular part and the supporting part such that said contacting area can cooperate with one or other of the first and second abutment areas.

Said first and second abutment areas and said contacting area are arranged so that:
- the cooperation of the contacting area with the first abutment area defines a first angular position of the tubular part with respect to said supporting part, and
- the cooperation of the contacting area with the second abutment area defines a second angular position of the tubular part with respect to said supporting part.

The tubular part is advantageously designed so that a liquid dispensing nozzle can be introduced into the tubular part in order to fill the liquid tank.

Thus, such a filler neck assembly allows an orientation of the tubular part with respect to the supporting part according to at least two predetermined angular positions. Said predetermined angular positions are determined by the positions of at least two different abutment areas. Thanks to that, it can be chosen, for instance, by the manufacturer or by the user and depending, for instance, on the type of vehicle, on the location of the liquid tank on the vehicle, on proximity of other vehicle equipment to the liquid tank and so on the available space around the liquid tank inlet, what is the better angular position of the tubular part in order to fill the liquid tank.

More precisely, the angular positions of the tubular part, that it is possible to choose with respect to the supporting part, are determined by at least two abutment areas which are attached to the supporting part or to the tubular part and which can cooperate with a contacting area attached to the other part which is selected between the tubular part and the supporting part. The expression "the other part which is selected between the tubular part and the supporting part" refers to the part to which are not attached the abutment areas. The cooperation of the contacting area with the first or the second abutment area ensures that the tubular part can remain maintained by abutment in the chosen angular position, with respect to supporting part and between two refilling operations of the liquid tank regardless of the vibrations and conditions of use of the vehicle.

The invention also concerns a liquid tank positioned on a motor vehicle and equipped with such a filler neck assembly. More especially, the invention concerns a urea tank positioned on a motor vehicle and equipped with such a filler neck assembly.

BRIEF DESCRIPTION OF THE DRAWINGS

The following detailed description of several embodiments of the invention is better understood when read in conjunction with the appended drawings. However, the invention is not limited to the specific embodiments disclosed herewith.

Hereinafter, FIGS. 1a and 1b are referred together FIG. 1; FIGS. 2a, 2b, 2c are referred together FIG. 2; FIGS. 5a and 5b are referred together FIG. 5; FIGS. 6a, 6b, 6c are referred together FIG. 6; FIGS. 7a and 7b are referred together FIG. 7.

DETAILED DESCRIPTION

Figure 1A:
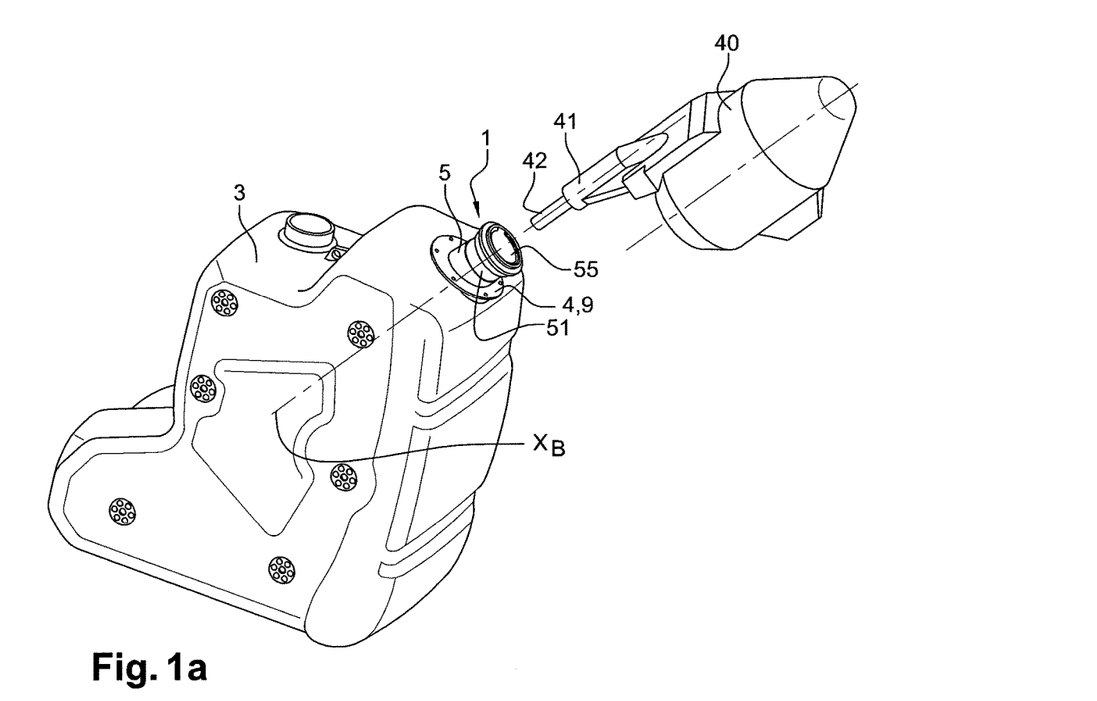
FIG. 1a is a perspective view of a liquid dispenser nozzle and of a liquid tank equipped with a filler neck assembly according to an embodiment of the invention.
Figure 1B:
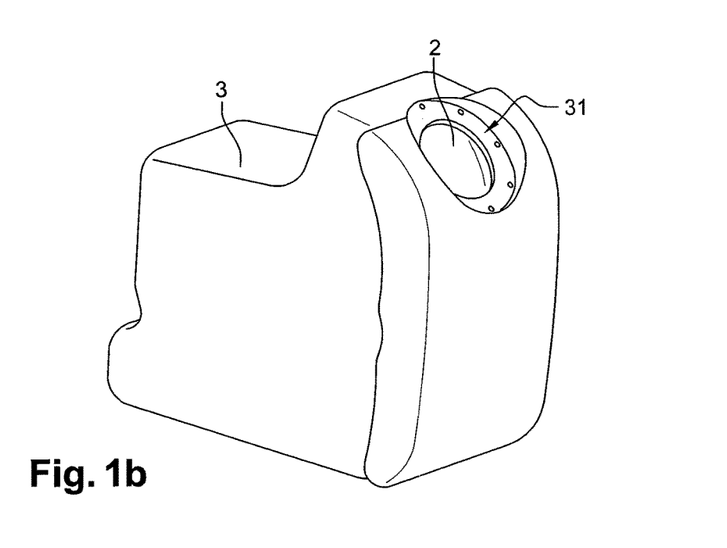
FIG. 1b is a perspective view of another liquid tank on which can be fixed a filler neck assembly according to the invention.

FIGS. 1 to 7 illustrate a filler neck assembly 1 that is designed to be fixed at the inlet 2 of a liquid tank 3 such as depicted on FIGS. 1, 2, 5 and 7. Such a liquid tank 3 can be, for instance, a fuel tank or a urea tank. The liquid tank of FIG. 1 is intended to be fixed on the chassis frame of a vehicle (not depicted).

In the example of FIGS. 1 to 7, the liquid tank 3 is a urea tank and the depicted filler neck assembly 1 is more specifically designed to be fixed at the inlet of such a urea tank.

The filler neck assembly 1, such as depicted on FIGS. 1 to 5 and 7, comprises at least two parts:
- a supporting part 4 that is designed to be fixed at the inlet 2 of the liquid tank 3 positioned on a motor vehicle and the supporting part includes a central through hole 7 mainly formed about a central axis XA,
- a tubular part 5 which is positioned in said central through hole 7, having a longitudinal axis XB and that is designed so that a liquid dispensing nozzle 41 of a liquid dispenser 40 can be introduced into the tubular part 5 in order to fill the liquid tank 3. More precisely, the supporting part 4 is designed to be fixed to the liquid tank 3 via a mounting surface 8 that can be realized by an annular mounting portion 9 of the supporting part 4. The mounting surface 8 of the supporting part 4 can be secured, for instance screwed, on a corresponding mounting surface 31 of the liquid tank 3 (shown in FIG. 1b).

Figure 4:
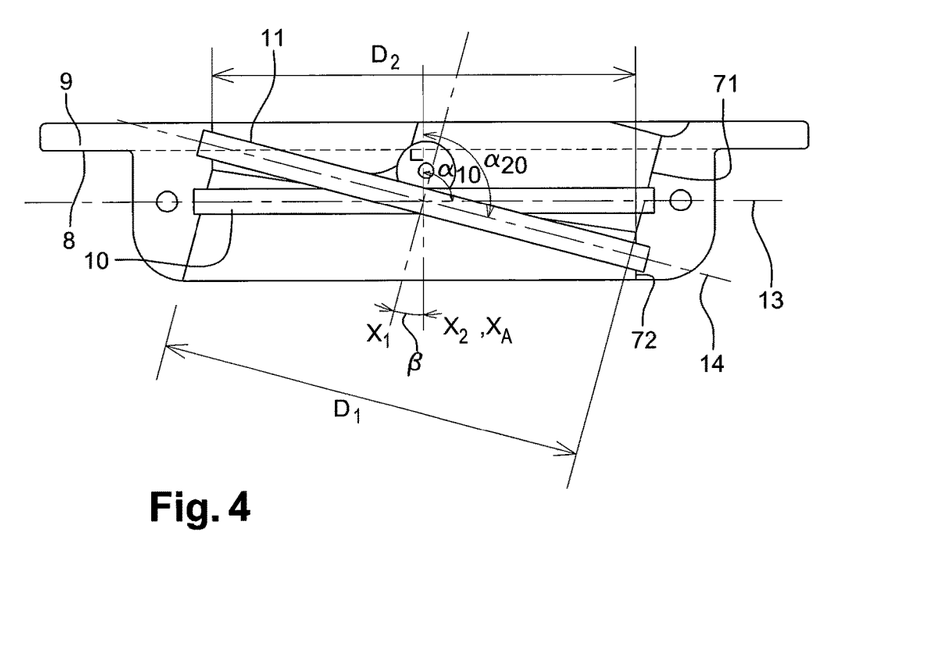
FIG. 4 is a cross-section of the supporting part of the filler neck assembly represented on FIGS. 2a, 2b, 2c, 3 and according to the direction arrow I on FIG. 3.

Preferably the central axis XA is substantially perpendicular to the mounting surface 8 of the supporting part 4 (see FIG. 4).

Figure 6A:
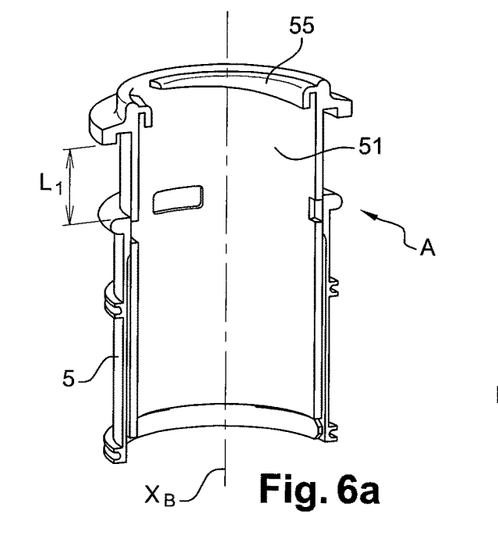
FIGS. 6a, 6b, 6c are cross-sections of perspectives representing the tubular sleeve in three different positions with respect to the tubular part.
Figure 6B:
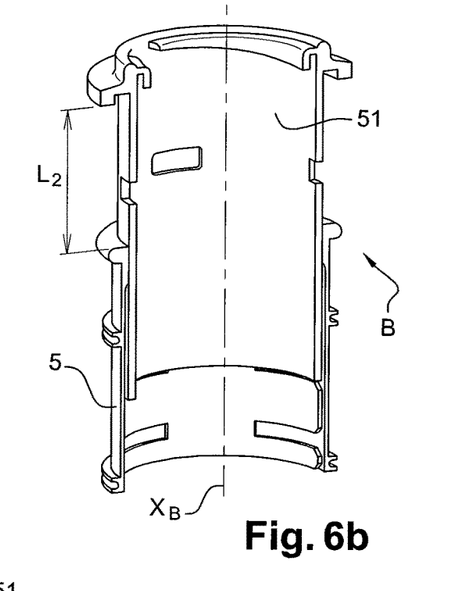
Figure 6C:
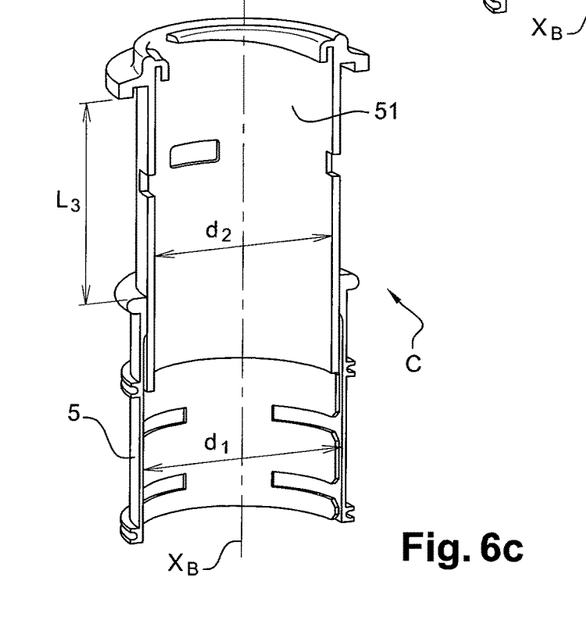
Figure 7A:
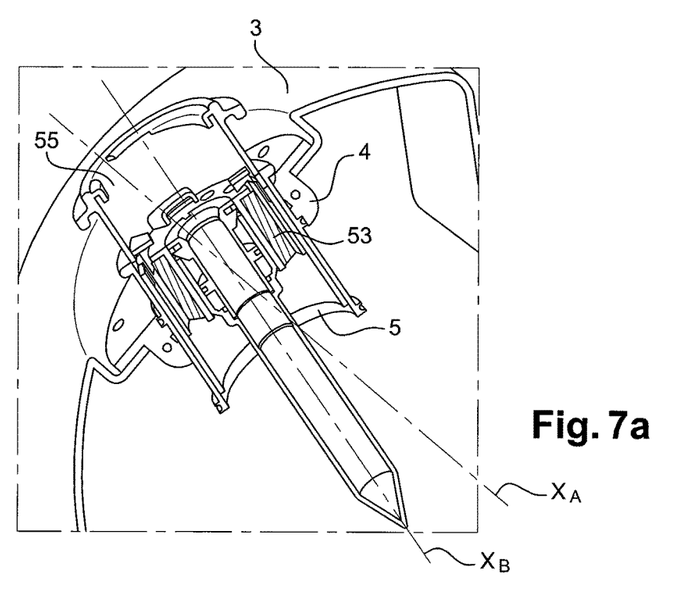
FIGS. 7a, 7b are cross-sections of perspectives of the liquid tank and the filler neck assembly of FIGS. 2a, 2b, 2c wherein the filler neck assembly is successively represented in a retracted position and in an extended position.
Figure 7B:
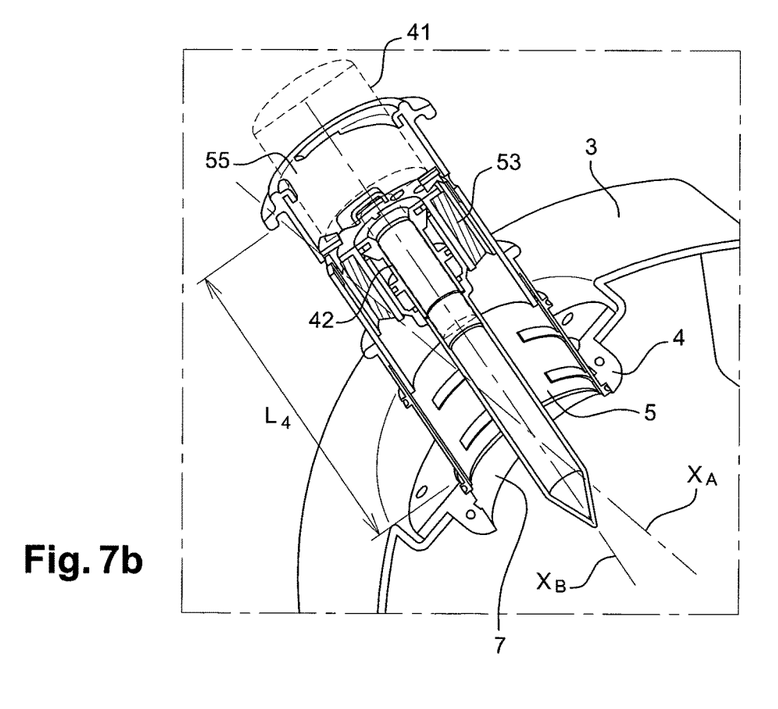

As depicted on FIGS. 1a, 6 and 7, the tubular part 5 may include a tubular sleeve 51 arranged to slide in the tubular part 5 along the longitudinal axis XB of the tubular part 5. The tubular sleeve 51 defines at its free end, opposite to the inside of the liquid tank 3, an opening 55 into which the liquid dispensing nozzle 41 can be introduced. A liquid filler cap (not represented) can be fixed on the tubular sleeve to close the opening 55.

The tubular sleeve 51 may slide in the tubular part 5 between two end positions A and C. The first end position A, depicted on FIGS. 2, 6a and 7a, may correspond to a retracted position where the tubular sleeve 51 is partially or totally retracted L1 in the tubular part 5 and the second end position C, depicted on FIGS. 6c and 7b, may correspond to an extended position where the tubular sleeve 51 extends L3 at least partially outside from the tubular part 5 and along the longitudinal axis XB. In the extended position C, when the filler neck assembly 1 is mounted on the liquid tank 3, the tubular sleeve 51 extends away from the liquid tank 3 in order to make easier filling operations of the liquid tank 3. Of course and such as represented on FIG. 6b some intermediate positions B of the tubular sleeve 51 with respect to the tubular part 5 are possible.

Figures 2A, 2B, 2C:
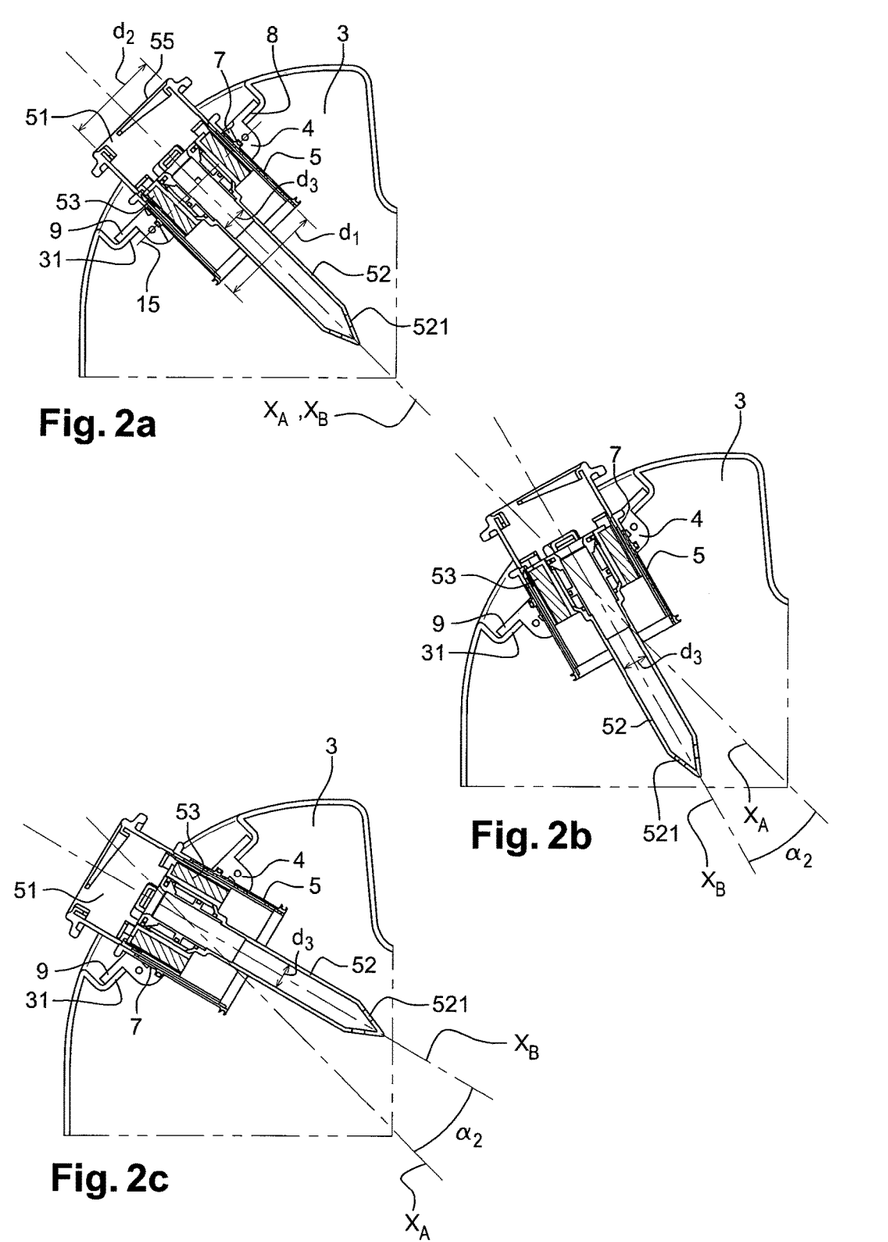
FIG. 2a is a schematic cross-sectional view showing a liquid tank and a filler neck assembly positioned at an inlet of the liquid tank wherein the tubular part is in a first angular position.
FIG. 2b is equivalent to FIG. 2a wherein the tubular part is in a second angular position and the filler neck assembly is in a first orientation with respect to the liquid tank.
FIG. 2c is equivalent to FIG. 2a wherein the tubular part is in a second angular position and the filler neck assembly is in a second orientation with respect to the liquid tank.
Figure 3:
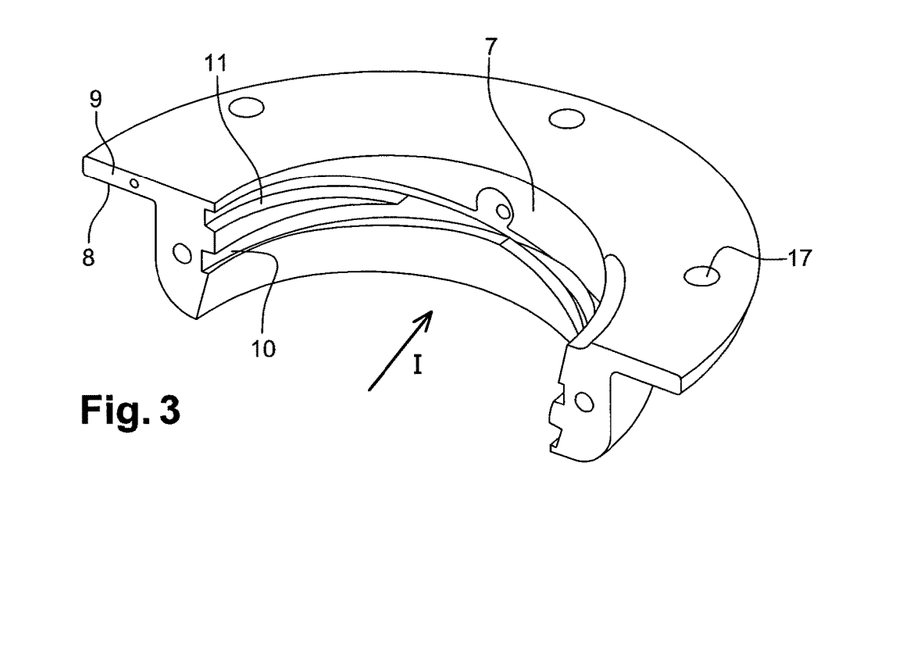
FIG. 3 is a cross-section of a perspective of the supporting part of the filler neck assembly represented on FIGS. 2a, 2b, 2c.

Furthermore and such as represented more specifically on FIGS. 2a, 2b and 2c, the filler neck assembly 1 may also comprises some failsafe means in order to prevent refilling of the liquid tank 3 with an inappropriate liquid, for instance to prevent refilling of a urea tank with fuel.

Failsafe means may consist in or comprise using an inner tubular element 52 having a cross-section with a specific shape or, such as depicted on FIGS. 2 and 7, a cross-section having a specific inner diameter d3 to which a complementary shape 42 of the dispensing nozzle 41 must correspond in order for the user to be able to introduce the dispensing nozzle 41 into the inner tubular part 5 (FIG. 7b).

The specific inner diameter d3 of the inner tubular element 52 is smaller than the inner diameter d1 of the tubular part 5 or than the inner diameter d2 of the tubular sleeve 51 (FIG. 2a).

In the example of FIGS. 2 and 7, the inner tubular element 52 has the shape of a spindle that extends along the longitudinal axis XB, that is radially fixed into the tubular sleeve 51 and that comprises at least one opening 521 at its free end extending inside the liquid tank 3. In a possible embodiment (not represented) where the filler neck assembly 1 is not provided with a tubular sleeve 51, the inner tubular element 52 can be radially fixed to the tubular part 5. The inner tubular element 52 may also include a filter element (not represented) located in the inner tubular element 52 near its free end.

As depicted on FIGS. 7a and 7b, false means may also consist in or comprise an electro-magnetic element or in a magnetic ring 53 that is located between the inner tubular element 52 and the tubular sleeve 51 or, when the later is not provided, between the inner tubular element 52 and the tubular part 5. The magnetic ring 53 is arranged to cooperate with a magnetic valve (not represented) preferably located in the dispensing nozzle 41 of the liquid dispenser 40. When the dispensing nozzle 41 of the liquid dispenser 40 is inserted in the filler neck assembly 1, the magnetic valve is actuated in an open position by the magnetic ring 53.

The magnetic ring 53 and the inner tubular element 52 are preferably arranged to cooperate together. Indeed, if the complementary shape 42 of the dispensing nozzle 41 doesn't correspond to the shape of the inner tubular element 52, for instance, if the diameter of the complementary shape 42 is bigger than the inner diameter d3, then the complementary shape 42 can't be introduced in the inner tubular element 52 and therefore the dispensing nozzle 41 can't be totally introduced into the tubular part 5. As a result, the magnetic valve is kept away from the magnetic ring 53 and can't be operated in an open position by the magnetic ring 53. Thanks to that it is prevented refilling, for instance, a urea tank with fuel.

Such as depicted on FIGS. 2 to 7, the filler neck assembly 1 further comprises at least a first abutment area 10 and a second abutment area 11. Said first and second abutment areas 10, 11 are both attached to the supporting part 4 or to the tubular part 5. The filler neck assembly 1 also comprises at least one contacting area 2 which is attached to the other part. In other words, said at least one contacting area 12 is attached to the part to which are not attached the first and the second abutment areas 10, 11. The contacting area 2 is arranged in or on the other part in such a manner that it can cooperate with one or other of the first and second abutment areas 10, 11.

The first and second abutment areas 10, 11 and the contacting area 12 are arranged so that the cooperation of the contacting area 12 with the first abutment area 10 defines a first angular position of the tubular part 5 with respect to said supporting part 4 and the cooperation of the contacting area 12 with the second abutment area 11 defines a second angular position of the tubular part 5 with respect to said supporting part 4.

A first angular position of the tubular part 5 is represented on FIG. 2a and a second position of the tubular part 5 is represented on FIGS. 2b and 2c.

The tubular part 5 can be manually movable between the first and the second angular position or it can be mounted by the manufacturer in the first or in the second position with or without possibility for the final user to change the angular position of the tubular part 5 with respect to said supporting part 4.

The first abutment area 0 can be arranged such that in the first angular position of the tubular part 5 the longitudinal axis XB of the tubular part 5 is inclined, according to a first angle a1, with respect to the central axis XA.

Alternatively, without departing from the invention and such as depicted on FIG. 2a, the first abutment area 10 can be arranged such that in the first angular position of the tubular part 5 the longitudinal axis XB of the tubular part 5 is merged with the central axis XA of the supporting part 4. When the first angular position corresponds to a position of the supporting part 4 where the longitudinal axis XB is merged with the central axis XA, then the first angle a1 is equal to zero: a1=0° (not represented).

Alternatively if, in the first angular position of the tubular part 5, the longitudinal axis XB is not merged with central axis XA but is inclined with respect to the central axis XA, the first angle a1 is less than 15° (variant not shown).

On FIG. 2b, the second abutment area 11 is arranged such that in the second angular position of the tubular part 5 the longitudinal axis XB is inclined, according to a second angle a2, with respect to the central axis XA—On FIG. 2c, the tubular part 5 is also positioned in the second angular position with respect to the supporting part 4. Indeed on FIG. 2c, the longitudinal axis XB is inclined with respect to the central axis XA according to the same second angle a2 as depicted on FIG. 2b. Nevertheless, the arrangement depicted on FIG. 2c differs from the one depicted on FIG. 2b because on FIG. 2c the supporting part 4 is fixed at the inlet of the liquid tank according to a second orientation that is different from the first orientation of the supporting part 4 depicted on FIG. 2b. Indeed, the supporting part 4 of FIG. 2c and therefore the filler neck assembly 1 are rotated around the central axis XA from a 180° angle with respect to the liquid tank 3 and compared to the first orientation of FIG. 2b.

The supporting part 4 can be rotated around the central axis XA according to different angular positions. When the supporting part 4 is fixed at the liquid tank inlet 2 via screws, the number of possible angular orientations is equal to the number of screw holes 17 regularly distributed on the annular mounting portion 9. For instance, if ten screw holes 17 are formed on the annular mounting portion 9, it is possible to adopt for the supporting part 4 up to ten different angular orientations around the central axis XA.

In the second angular position (FIGS. 2b and 2c) of the tubular part 5 with respect to the supporting part 4, the longitudinal axis XB is inclined with respect to the central axis XA according to a second angle a2 that is preferably comprised between 5 and 65° and more preferably between 10 and 35°. In the example of FIGS. 2b and 2c, the second angle a2 is about 15°. The first and second angular positions of the tubular part 5 with respect to the supporting part 4 and such as previously described correspond to some ergonomic positions for the user that can be chosen depending, for instance, on the type of vehicle, on the location of the liquid tank 3 on the vehicle, on the proximity of other vehicle equipment to the liquid tank 3 and so depending at the available space around the liquid tank inlet 2.

Such as depicted on FIGS. 1 to 7, first and second abutment areas can be formed in said central through hole 7 by respective first and second annular grooves 10, 11 and the contacting area can be formed by an annular rib 12 that protrudes around the tubular part 5 and that is designed to engage one or other of the first and second annular grooves 10, 11. Of course the invention is not limited to this particular arrangement and abutment and contacting surfaces can be formed by different shapes and/or devices without departing from the invention.

In a not represented variant, annular rib 12 could be, for instance, replaced by pins that protrude radially from the outside periphery of the tubular part 5 and annular grooves 10, 11 can be replaced by corresponding holes formed in the central through hole 7 and in which can be inserted radial pins.

In another variant, not represented, the configuration can be inverted compared to the one depicted on FIGS. 2 to 7. For instance, said contacting area can be formed in the central through hole 7 of the supporting part 4 by an annular groove and said at least first and second abutment areas can be formed by respective first and second annular ribs that protrude around the tubular part 5. Annular groove of the supporting part 4 and first and second annular ribs of the tubular part 5 are designed so that in the first angular position of the tubular part 5 the first annular rib 5 engages the annular groove of the supporting part 4 and in the second angular position of the tubular part 5 the second annular rib engages the annular groove of the supporting part 4.

In a further variant, compared to the embodiment of FIGS. 2 to 7, groove(s) can be formed around the tubes and rib(s) can be formed in the central through hole 7.

Alternatively annular ribs can be replaced by rings such as retaining rings.

When an annular rib 12 (FIGS. 2 to 7) or a retaining ring (not represented) is used as contacting surface, said annular rib 12 or retaining ring preferably lies on a plane 15 (FIG. 2a) that is perpendicular to the longitudinal axis XB of said tubular part 5.

When a first annular groove 10 is used as a first abutment surface, said first annular groove 10 lies on a first plane 13 (FIG. 4) that is inclined with respect to the central axis XA and according to a first inclination a10. The first inclination a10 corresponds to the first angle a1 plus 90°.

When a second annular groove is used as a second abutment surface, said second annular groove lies on a second plane 14 (FIG. 4) that is inclined with respect to the central axis XA according to a second inclination a20. The second inclination a20 corresponds to the first angle ct2 plus 90°.

Preferably, first plane 13, on which the first annular groove 10 lies, is substantially perpendicular to the central axis XA. In this case wherein a1 is equal to 0, a10 is equal to 90°. The second plane 14, on which the second annular groove 11 lies, is preferably inclined with respect to the central axis XA with an angle comprised between 95° and 155° and more preferably with an angle comprised between 100° and 125°. In the particular embodiment of FIGS. 2 to 7 wherein a2 is about 15°, a20 is about 105°.

Some sealing elements 20, 25 are advantageously provided between the tubular part 5 and the supporting part 4. Preferably and such as depicted in greater detail on FIGS. 5a and 5b, at least one annular sealing element 20 is positioned in an annular groove 21 that is formed around the annular rib 12.

Figure 5A:
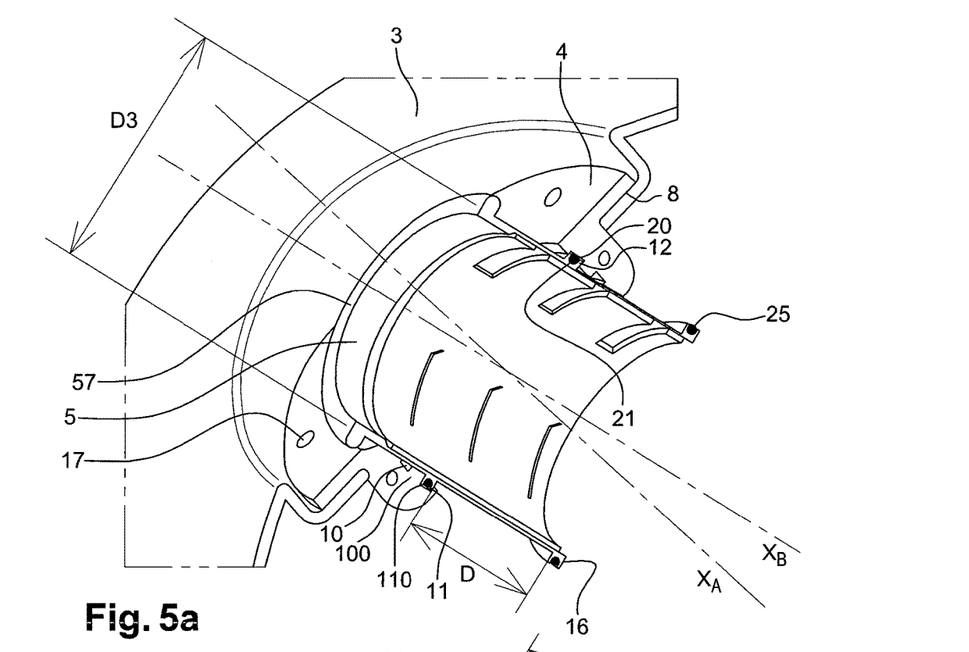
FIG. 5a is a cross-section of a perspective of the filler neck assembly mounted at an inlet of the liquid tank and showing, more especially, the supporting part and the tubular part in a third position.
Figure 5B:
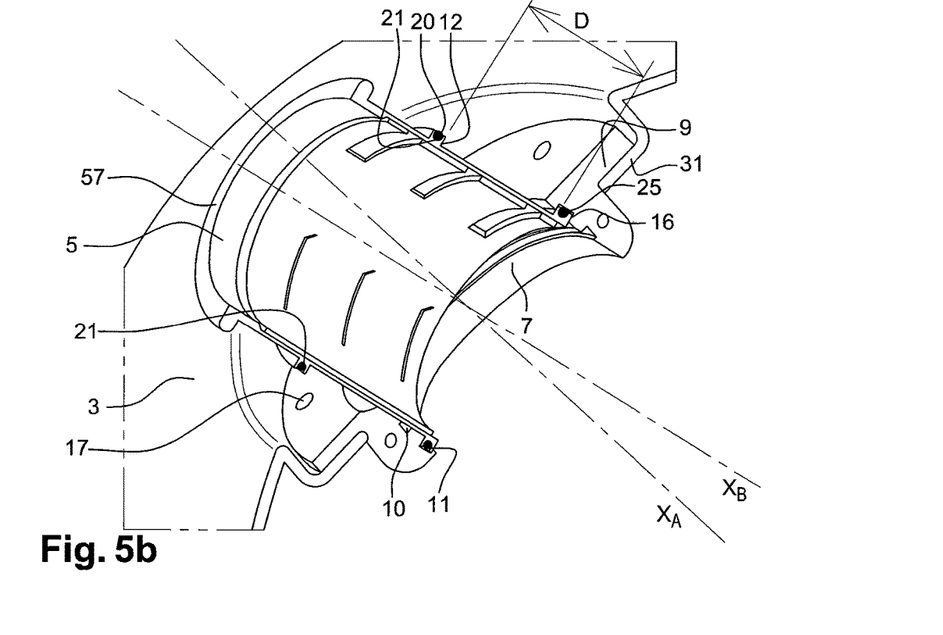
FIG. 5b is a cross-section of a perspective of the filler neck assembly mounted at an inlet of the liquid tank and showing, more especially, the supporting part and the tubular part in a fourth position.

In order to ensure tightness, the first and second annular grooves 10, 11, the annular rib 12, the annular groove 21 and the sealing element 20 are sized such that, when the tubular part 5 is positioned in the central through hole of the annular part 4, the sealing element 20 is radially pressed against the bottom surface of the first or second annular groove 10, 11 in which the annular rib 12 is engaged.

In a preferred variant such as depicted on FIGS. 5a, 5b, 7a and 7b, the tubular part 5 is provided with at least a second annular rib 16 protruding around the tubular part 5, that is coaxial and that lies in a plane that is parallel to the plane 15 wherein lies the first annular rib 12. The second annular rib 16 is located at distance D from the first annular rib 12 and is also designed to engage one or other of the first and second annular grooves 0, 11. Thanks to this arrangement, third and fourth new positions of the tubular part 5 can be defined with respect to said supporting part 4.

Such as depicted on FIGS. 5a and 7a, a third position can be when the first annular rib 12 is engaged in the first or in the second annular groove 10, 11. The first annular rib 12 can be located around the tubular part 5 in such a manner that in the third position the tubular part 5 is partially or totally retracted in the filler neck assembly 1 so that the tubular part 5 doesn't project or doesn't excessively project outwardly from the liquid tank 3. Such as depicted on FIG. 5b or 7b, a fourth position can be when it is the second annular rib 16 that is engaged in the first or in second annular groove 0, 11. The second annular rib 16 can be located around the tubular part 5 in such a manner that in the fourth position the tubular part 5 extends from the supporting part 4 according to the longitudinal axis XB and projects outwardly from the liquid tank 3. In the fourth position, depicted on FIGS. 5b and 7b, because the tubular part 5 projects outwardly from the liquid tank 3, it is easier for the user to fill the liquid tank whereas in the third position, depicted on FIGS. 5a and 7a, the tubular part 5 is protected from outside shocks. Preferably, the tubular part 5 can be manually slide between the third and the fourth position along the longitudinal axis XB.

The tubular sleeve 51 such as previously described in reference to FIGS. 2 and 7 can be used, such as depicted on FIGS. 7a and 7b, in conjunction with third and fourth positions of the tubular part 5 in order to increase the length L4 of the extension formed by the cooperation of both the tubular part 5 and the tubular sleeve 51 and extending along the longitudinal axis XB. Indeed and such as represented on FIG. 7b, when the tubular part 5 is in its fourth position and the tubular sleeve 51 is extended away from the liquid tank 3, the opening 55, formed at the outside free end of the tubular sleeve 51, is at distance L4 from the liquid tank 3 such that it is easier for the user to introduce the liquid dispensing nozzle 41 in the opening 55. As previously explained and such as represented on FIGS. 7b both the tubular part 5 and the tubular sleeve 51 can be in a retracted position with respect to the supporting part 4. In such a retracted position the tubular part 5 and the tubular sleeve 51 don't project or do not excessively project outwardly from the liquid tank 3 so that the filler neck assembly 1 is protected from outside shocks between two filling operations.

Of course and because the tubular part 5 and the tubular sleeve 51 can each be configured according to different positions, the extension formed by the tubular part 5 and the tubular sleeve 51 can extend according to different length L4 measured along the longitudinal axis XB.

As represented on FIGS. 2 to 5 and 7 and more especially on FIG. 4 the central through hole 7 is preferably formed by the intersection of a first cylinder 71 and a second cylinder 72. First and second cylinders 71, 72 have a circular cross-section, they have approximately the same diameters D1 and D2 and they are arranged each other so that their respective axis of revolution X1, X2 intersect together with an angle of intersection β comprised between 1 and 45°, preferably between 5 and 25°.

When the central through hole 7 is formed by the intersection of a first cylinder 71 and a second cylinder 72:
- the first annular groove 10 is formed in the first cylinder 71 and the second annular groove 1 is formed in the second cylinder 72;
- preferably, the axis of revolution X2 of the second cylinder 72 is merged with the central axis XA;
- the first and the second cylinders 71, 72 have diameters D1, D2 that are approximately equal to the outside diameter D3 (FIG. 5a) of the tubular part 5.

In practice, D1 and D2 diameters are slightly bigger than D3 diameter to preserve a radial clearance between tubular part 5 and central through hole 7 in order to authorize a sliding motion of the tubular part 5 with respect to the supporting part 4. This radial clearance is useful, for instance, to allow, in a mounting phase, the introduction of the tubular part 5 into the supporting part 4, to allow tilting motions between the first and the second angular position or to allow sliding motions between the third position (FIGS. 5a and 7a) and the fourth position (FIGS. 5b and 7b).

The invention is not limited to the illustrated embodiment described above by way of a non-limiting example, but can be varied within the scope of the following patent claims.

For instance, according to another embodiment and without departing from the scope of the invention as defined in the appended claims, the inner sleeve 51, the inner tubular element 52, the magnetic ring 53 can be omitted when there are not requested by the considered application of the filler neck assembly. In this embodiment, the design of the filler neck assembly can be equivalent to the one represented on FIGS. 5a and 5b. A liquid filler cap (not represented) can be closed directly on the free end 57 of the tubular part 5 that is opposite to the inside of the tank 3 and that forms the opening for filling the liquid tank 3.

In the present description two different angular positions of the tubular part 5 with respect to supporting part 4 are described. Of course, more than two angular positions are possible. For instance, the through hole 7 can be provided with more than two annular grooves with different orientations in order to determine more than two angular positions of the tubular part 4 with respect to supporting part 5.

The invention claimed is:

1. A filler neck assembly comprising:
a supporting part designed to be fixed at an inlet of a liquid tank positioned on a motor vehicle and the supporting part having a central through hole mainly formed about a central axis,
a tubular part that is positioned in the central through hole and the tubular part having a longitudinal axis, wherein the filler neck assembly further comprises
at least a first abutment area and a second abutment area attached to one part which is selected between the supporting part and the tubular part,
at least one contacting area attached to another part which is selected between the tubular part and the supporting part such that the contacting area can cooperate with one or other of the first and second abutment areas,
wherein the first and second abutment areas and the contacting area are arranged so that the cooperation of the contacting area with the first abutment area defines a first angular position of the tubular part with respect to the supporting part and cooperation of the contacting area with the second abutment area defines a second angular position of the tubular part with respect to the supporting part.

2. The filler neck assembly according to claim 1, wherein first and second abutment areas and the contacting area are arranged such that in the first angular position the longitudinal axis is merged with the central axis or inclined with respect to the central axis according to a first angle and such that in the second angular position the longitudinal axis is inclined with respect to the central axis according to a second angle.

3. The filler neck assembly according to claim 2, wherein first and second abutment areas are arranged such that in the first angular position the longitudinal axis is merged with the central axis or inclined with respect to the central axis with a first angle less than 15° and in the second angular position the longitudinal axis is inclined with respect to the central axis with a second angle comprised between 5 and 65° preferably between 10 and 35°.

4. The filler neck assembly according to claim 1, wherein the at least first and second abutment areas are formed in the central through hole by respective first and second annular grooves and the at least one contacting area is formed by at least one annular rib that protrudes around the tubular part and that is designed to engage one or other of the first and second annular grooves.

5. The filler neck assembly according to claim 4, wherein the first annular groove lies on a first plane that is inclined with respect to the central axis according to a first inclination and the second annular groove lies on a second plane that is inclined with respect to the central axis according to a second inclination.

6. The filler neck assembly according to claim 5, wherein the first plane is substantially perpendicular to the central axis and the second plane is inclined with respect to the central axis with an angle comprised between 95° and 155°, and preferably with an angle comprised between 100° and 125°.

7. The filler neck assembly according to claim 4, wherein the annular rib lies on a plane that is perpendicular to the longitudinal axis of the tubular part.

8. The filler neck assembly according to claim 7, wherein an annular groove is formed in the annular rib and a seal ring is positioned in the annular groove of the annular rib.

9. The filler neck assembly according to claim 8, wherein the first and second annular grooves, the annular rib, the annular groove formed in the annular rib and the seal ring are sized such that, when the tubular part is inserted in the central through hole of the annular part, the seal ring is radially pressed against the bottom surface of the first or second annular groove in which the annular rib is engaged.

10. The filler neck assembly according to claim 4, wherein the annular rib according to claim 4 is a first annular rib and the tubular part is provided with at least a second annular rib protruding around the tubular part, parallel to the first annular rib and located at distance from the first annular rib.

11. The filler neck assembly according to claim 10, wherein the second annular rib is designed to engage one or other of the first and second annular grooves to define with the first annular rib third and fourth positions of the tubular part with respect to the supporting part.

12. The filler neck assembly according to claim 1, wherein the central through hole is formed by the intersection of a first cylinder and a second cylinder having a circular cross-section, having approximately the same diameter and arranged to each other so that their respective axes of revolution intersect together with an angle of intersection (β) comprised between 1 and 45°, preferably between 5 and 25°.

13. The filler neck assembly according to claim 4, wherein the first annular groove is formed in the first cylinder and the second annular groove is formed second cylinder.

14. The filler neck assembly according to claim 12, wherein the axis of revolution of the first cylinder is merged with the central axis.

15. The filler neck assembly according to claim 12, wherein the first and the second cylinders have a diameter that is approximately the same as the outside diameter of the tubular part.

16. The filler neck assembly according to claim 1, wherein the at least one contacting area is formed in the central through hole by an annular groove and the at least first and second abutment areas are formed by respective first and second annular ribs that protrude around the tubular part and that are designed so that in the first angular position the first annular rib engages the annular groove and in the second annular position the second annular rib engages the annular groove.

17. The filler neck assembly according to claim 1, wherein the tubular part includes a tubular sleeve arranged to slide in the tubular part, along the longitudinal axis, between a retracted position where the tubular sleeve is partially or totally retracted in the tubular part and an extended position where the tubular sleeve extends outside from the tubular part.

18. The filler neck assembly according to claim 1, wherein the supporting plate has a mounting surface to fix the filler neck assembly on a liquid tank and in that the central axis is substantially perpendicular to the mounting surface.

19. The filler neck assembly according to claim 1 characterized is that the tubular part is movable between the first and the second angular position.

20. The filler neck assembly according to claim 1 characterized is that the tubular part is mounted in the first or in the second angular position.

21. The filler neck assembly according to claim 1, wherein it is designed to be fixed at the inlet of a urea tank.

22. A liquid tank positioned on a motor vehicle wherein the liquid tank is equipped with a filler neck assembly according to claim 1.

23. A urea tank positioned on a motor vehicle wherein the urea tank is equipped with a filler neck assembly according to claim 21.

* * * * *